(12) United States Patent
Takamatsu et al.

(10) Patent No.: US 11,303,146 B2
(45) Date of Patent: Apr. 12, 2022

(54) CHARGING DEVICE

(71) Applicant: TOYOTA JIDOSHA KABUSHIKI KAISHA, Aichi-ken (JP)

(72) Inventors: Naoyoshi Takamatsu, Shizuoka-ken (JP); Hirotsugu Ohata, Susono (JP); Takuya Sakamoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 32 days.

(21) Appl. No.: 17/013,883

(22) Filed: Sep. 8, 2020

(65) Prior Publication Data
US 2021/0091585 A1 Mar. 25, 2021

(30) Foreign Application Priority Data
Sep. 20, 2019 (JP) .............................. JP2019-172236

(51) Int. Cl.
| H02J 7/00 | (2006.01) |
|---|---|
| H02P 27/08 | (2006.01) |
| H02M 7/5387 | (2007.01) |
| H02P 25/18 | (2006.01) |
| B60L 50/60 | (2019.01) |
| B60L 53/16 | (2019.01) |
| B60L 53/20 | (2019.01) |
| B60L 58/10 | (2019.01) |
| H02J 7/34 | (2006.01) |

(52) U.S. Cl.
CPC ............ *H02J 7/0068* (2013.01); *B60L 50/60* (2019.02); *B60L 53/16* (2019.02); *B60L 53/20* (2019.02); *B60L 58/10* (2019.02); *H02J 7/007* (2013.01); *H02J 7/345* (2013.01); *H02M 7/53871* (2013.01); *H02P 25/18* (2013.01); *H02P 27/08* (2013.01); *H02J 2207/20* (2020.01); *H02J 2207/50* (2020.01)

(58) Field of Classification Search
CPC .......... H02J 7/0068; H02J 7/007; H02J 7/345; H02J 2207/20; H02J 2207/50; B60L 53/20; B60L 50/60; B60L 58/10; B60L 53/16; H02M 7/53871; H02P 25/18; H02P 27/08
See application file for complete search history.

(56) References Cited

U.S. PATENT DOCUMENTS 7,332,882 B2 * 2/2008 Aoyagi .................. B60L 58/10
318/139
2007/0216338 A1 9/2007 Yoshimoto et al.

FOREIGN PATENT DOCUMENTS

JP 2007252074 A 9/2007

* cited by examiner

*Primary Examiner* — Carlos Amaya
(74) *Attorney, Agent, or Firm* — Hauptman Ham, LLP

(57) ABSTRACT

A charging device includes: first and second capacitors connected in series between a positive electrode and a negative electrode of a storage battery; first and second switching elements each including a plurality of switching elements; first and second terminals; first and second changeover switches; and a control circuit controlling opening and closing of the first switching elements and the second switching elements to switch between a first state to charge the first capacitor with an external direct-current power source and a second state to charge the second capacitor with the external direct-current power source.

7 Claims, 11 Drawing Sheets

CHARGING DEVICE

CROSS-REFERENCE TO RELATED APPLICATION(S)

The present application claims priority to and incorporates by reference the entire contents of Japanese Patent Application No. 2019-172236 filed in Japan on Sep. 20, 2019.

BACKGROUND

The present disclosure relates to a charging device.

In the related art, there has been a known technique for supplying alternating current (AC) power from an external AC power source to a storage battery via a switch unit to charge the storage battery (for example, see Japanese Laid-open Patent Publication No. 2007-252074).

SUMMARY

There is a need for providing a charging device capable of charging a storage battery with an external direct-current power source having a maximum output voltage lower than the nominal voltage of the storage battery.

According to an embodiment, a charging device includes: first and second capacitors connected in series between a positive electrode and a negative electrode of a storage battery; a first switching element including a plurality of switching elements and capable of selectively connecting a first midpoint between a first upper arm and a first lower arm of an inverter driving a rotating electric machine to any one of the positive electrode, the negative electrode, and a voltage dividing point between the first and the second capacitors; a second switching element including a plurality of switching elements and capable of selectively connecting a second midpoint between a second upper arm and a second lower arm of the inverter to any one of the positive electrode, the negative electrode, and the voltage dividing point; a first terminal connectable to the first midpoint and to a positive-electrode terminal of an external direct-current power source; a second terminal connectable to the second midpoint and to a negative-electrode terminal of the external direct-current power source; a first changeover switch capable of switching connection and disconnection between a winding of the rotating electric machine and the first midpoint; a second changeover switch capable of switching connection and disconnection between the winding of the rotating electric machine and the second midpoint; and a control circuit controlling, while the first midpoint and the positive-electrode terminal of the external direct-current power source are connected via the first terminal, while the second midpoint and the negative-electrode terminal of the external direct-current power source are connected via the second terminal, and while the first changeover switch and the second changeover switch are in an open state, opening and closing of the first switching elements and the second switching elements to switch between a first state, in which the first midpoint and the positive electrode are connected and the second midpoint and the voltage dividing point are connected to charge the first capacitor with the external direct-current power source, and a second state, in which the first midpoint and the voltage dividing point are connected and the second midpoint and the negative electrode are connected to charge the second capacitor with the external direct-current power source.

DETAILED DESCRIPTION OF THE PREFERRED EMBODIMENT

In the related art, storage batteries mounted on electric vehicles have different specifications in nominal voltages, such as 400 V and 800 V. Corresponding to this, external direct-current (DC) power sources that output DC power have specifications different in maximum output voltages, such as 400 V class or 800 V class.

For this reason, if the maximum output voltage of an external DC power source is lower than the nominal voltage of a storage battery, the storage battery cannot be charged by the external DC power source.

Hereinafter, exemplary embodiments of the present disclosure will be disclosed. The configurations of the embodiments described below, and the functions and results (effects) provided by the configurations are merely examples. The present disclosure can be implemented by configurations other than the configurations disclosed in the following embodiments. In addition, according to the present disclosure, it is possible to obtain at least one of various effects (including secondary effects) obtained by the following configurations.

The embodiments described below have similar configurations. Thus, according to the configurations of the embodiments, similar functions and effects based on the similar configurations can be obtained. In addition, those similar configurations are denoted by similar reference signs, and redundant description will be omitted in the following description.

In this specification, the ordinal numbers are allocated for the sake of convenience to distinguish parts, portions and the like and do not indicate the priority order or the order.

First Embodiment

System Configuration

Figure 1:
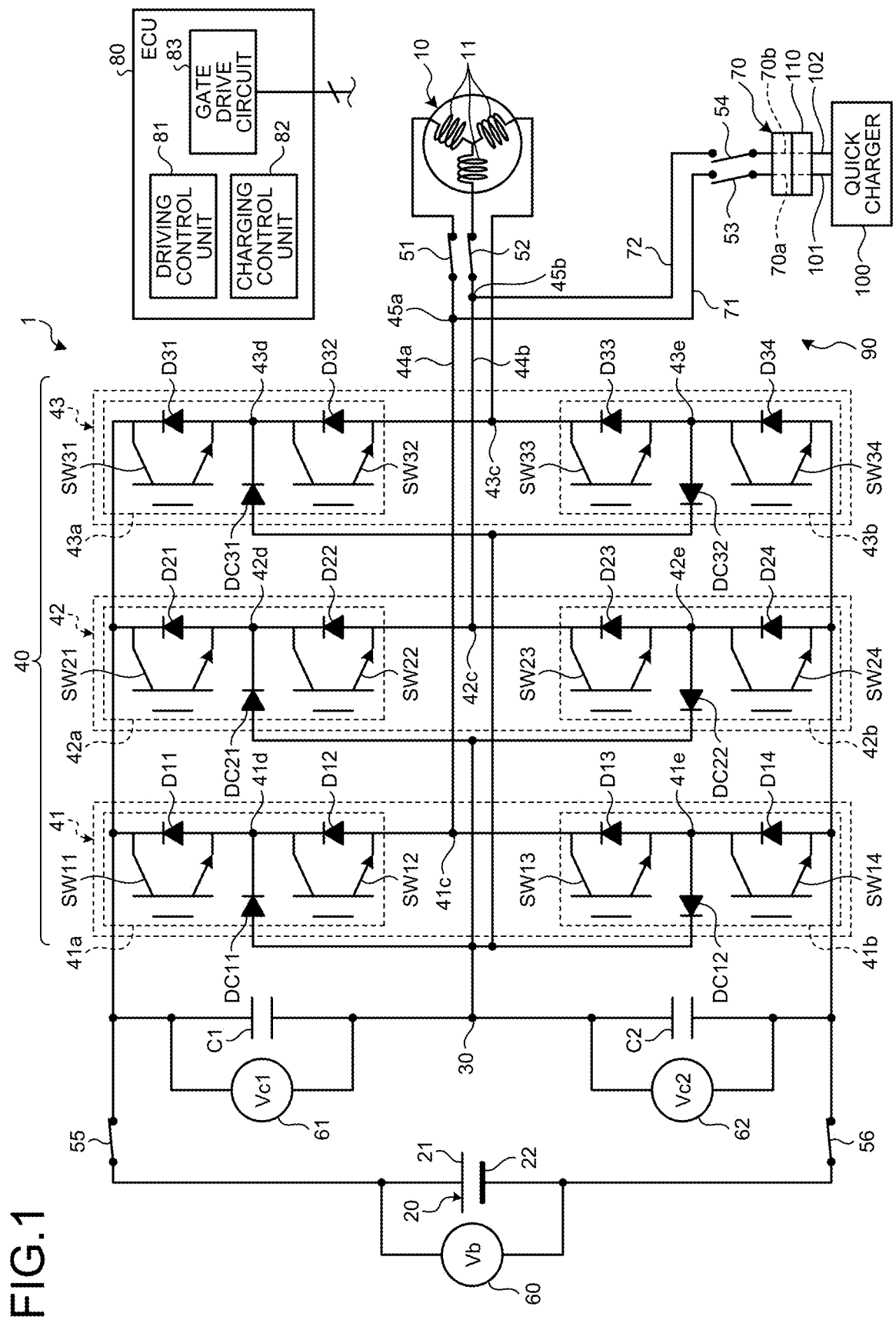
FIG. 1 is a configuration diagram of a vehicle drive system including a charging device according to an embodiment.

FIG. 1 is a configuration diagram of a vehicle drive system 1 including a charging device 90 according to an embodiment. The vehicle drive system 1 can be applied to an electric vehicle capable of traveling using electric power, such as an electric car, a hybrid vehicle, a plug-in hybrid vehicle (PHV), or a range extended electric vehicle (REEV).

The vehicle drive system 1 is mounted on an electric vehicle and includes a motor generator 10 for driving the vehicle, a battery 20 as a power source, a first capacitor C1, a second capacitor C2, an inverter 40 as a power converter, changeover switches 51 to 56, a connector 70, and an electronic control unit (ECU) 80.

The motor generator 10 is an AC rotating electric machine and is, for example, a three-phase AC synchronous motor in which a permanent magnet is embedded in a rotor. The motor generator 10 serves as an electric motor to drive a drive shaft (not illustrated). The motor generator 10 further serves as a generator to generate regenerative electric power when the vehicle is braked or travels downhill. The motor generator 10 may serve as an electric motor to start an engine (not illustrated). The motor generator 10 is an example of a rotating electric machine.

The battery 20 is a chargeable and dischargeable battery, such as a lithium ion assembled battery, a nickel hydrogen assembled battery, a nickel cadmium battery, or a lead storage battery. A terminal voltage Vb of the battery 20 is detected by a voltage sensor 60. The battery 20 is an example of a storage battery.

The first capacitor C1 and the second capacitor C2 are connected in series between a positive electrode 21 and a negative electrode 22 of the battery 20. Of the first capacitor C1 and the second capacitor C2, the first capacitor C1 is provided on the high voltage side, and the second capacitor C2 is provided on the low voltage side. The specifications (for example, capacities) of the first capacitor C1 and the second capacitor C2 are the same. A terminal voltage Vc1 of the first capacitor C1 is detected by a voltage sensor 61, and a terminal voltage Vc2 of the second capacitor C2 is detected by a voltage sensor 62.

A changeover switch 55 is provided between the positive electrode 21 of the battery 20 and the first capacitor C1, and a changeover switch 56 is provided between the negative electrode 22 of the battery 20 and the second capacitor C2. These changeover switches 55 and 56 are relays capable of switching between an open state and a closed state according to a control signal from the ECU 80.

The inverter 40 is a three-phase inverter having three arms (legs) 41, 42, and 43 parallel with each other.

The arm 41 includes an upper arm 41a and a lower arm 41b connected in series. The upper arm 41a is provided between the positive electrode 21 of the battery 20 and a first midpoint 41c. The lower arm 41b is provided between the negative electrode 22 of the battery 20 and the first midpoint 41c. The first midpoint 41c is provided between the upper arm 41a and the lower arm 41b. The upper arm 41a is an example of a first upper arm, and the lower arm 41b is an example of a first lower arm.

The first midpoint 41c is provided so as to be connectable to a winding 11 of the motor generator 10 via the changeover switch 51. The changeover switch 51 is a relay capable of switching between an open state and a closed state according to a control signal from the ECU 80. The changeover switch 51 is an example of a first changeover switch.

The arm 41 constitutes a neutral-point-clamp three-level inverter. Between the positive electrode 21 of the battery 20 and the first midpoint 41c, two switching elements SW11 and SW12 connected in series are provided. Of the two switching elements SW11 and SW12, the switching element SW11 is provided on the high voltage side, and the switching element SW12 is provided on the low voltage side.

In addition, two switching elements SW13 and SW14 connected in series are provided between the first midpoint 41c and the negative electrode 22 of the battery 20. Of the two switching elements SW13 and SW14, the switching element SW13 is provided on the high voltage side, and the switching element SW14 is provided on the low voltage side. The switching elements SW11 to SW14 are examples of first switching elements.

Freewheeling diodes D11 to D14 are connected in parallel with the switching elements SW11 to SW14, respectively.

Between a high-voltage-side dividing point 41d and a voltage dividing point 30, a high-voltage-side clamp diode DC11 is provided. The high-voltage-side dividing point 41d is provided between the switching element SW11 and the switching element SW12 of the upper arm 41a. The voltage dividing point 30 is provided between the first capacitor C1 and the second capacitor C2. The high-voltage-side clamp diode DC11 allows current to flow from the voltage dividing point 30 to the high-voltage-side dividing point 41d and prevents current from flowing from the high-voltage-side dividing point 41d to the voltage dividing point 30.

Between a low-voltage-side dividing point 41e and the voltage dividing point 30, a low-voltage-side clamp diode DC12 is provided. The low-voltage-side dividing point 41e is provided between the switching element SW13 and the switching element SW14 of the lower arm 41b. The low-voltage-side clamp diode DC12 allows current to flow from the low-voltage-side dividing point 41e to the voltage dividing point 30 and prevents current from flowing from the voltage dividing point 30 to the low-voltage-side dividing point 41e.

The arm 42 includes an upper arm 42a and a lower arm 42b connected in series. The upper arm 42a is provided between the positive electrode 21 of the battery 20 and a second midpoint 42c. The lower arm 42b is provided between the negative electrode 22 of the battery 20 and the second midpoint 42c. The second midpoint 42c is provided between the upper arm 42a and the lower arm 42b. The upper arm 42a is an example of a second upper arm, and the lower arm 42b is an example of a second lower arm.

The second midpoint 42c is provided so as to be connectable to the winding 11 of the motor generator 10 via the changeover switch 52. The changeover switch 52 is a relay capable of switching between an open state and a closed state according to a control signal from the ECU 80. The changeover switch 52 is an example of a second changeover switch.

The arm 42 constitutes a neutral-point-clamp three-level inverter. Between the positive electrode 21 of the battery 20 and the second midpoint 42c, two switching elements SW21 and SW22 connected in series are provided. Of the two switching elements SW21 and SW22, the switching element SW21 is provided on the high voltage side, and the switching element SW22 is provided on the low voltage side.

In addition, two switching elements SW23 and SW24 connected in series are provided between the second midpoint 42c and the negative electrode 22 of the battery 20. Of the two switching elements SW23 and SW24, the switching element SW23 is provided on the high voltage side, and the switching element SW24 is provided on the low voltage side. The switching elements SW21 to SW24 are examples of second switching elements.

Freewheeling diodes D21 to D24 are connected in parallel with the switching elements SW21 to SW24, respectively.

Between a high-voltage-side dividing point 42d and the voltage dividing point 30, a high-voltage-side clamp diode DC21 is provided. The high-voltage-side dividing point 42d is provided between the switching element SW21 and the switching element SW22 of the upper arm 42a. The high-voltage-side clamp diode DC21 allows current to flow from the voltage dividing point 30 to the high-voltage-side dividing point 42d and prevents current from flowing from the high-voltage-side dividing point 42d to the voltage dividing point 30.

Between a low-voltage-side dividing point 42e and the voltage dividing point 30, a low-voltage-side clamp diode DC22 is provided. The low-voltage-side dividing point 42e is provided between the switching element SW23 and the switching element SW24 of the lower arm 42b. The low-voltage-side clamp diode DC22 allows current to flow from the low-voltage-side dividing point 42e to the voltage dividing point 30 and prevents current from flowing from the voltage dividing point 30 to the low-voltage-side dividing point 42e.

The arm 43 includes an upper arm 43a, a lower arm 43b, a third midpoint 43c, a high-voltage-side dividing point 43d, a low-voltage-side dividing point 43e, switching elements SW31 to SW34, freewheeling diodes D31 to D34, a high-voltage-side clamp diode DC31, and a low-voltage-side clamp diode DC32. Since the arm 43 has a similar configuration to those of the arms 41 and 42, detailed description of the arm 43 is omitted. Note that, no changeover switch like the changeover switch 51 or 52 is provided between the third midpoint 43c and the winding 11.

The switching elements SW11 to SW14, SW21 to SW24, and SW31 to SW34 are, for example, insulated gate bipolar transistors (IGBTs), metal oxide semiconductor field effect transistors (MOSFETs), or the like.

The vehicle drive system 1 further includes a connector 70, a positive-electrode wiring 71, and a negative-electrode wiring 72 so that the battery 20 is chargeable with DC power supplied from a quick charger 100 (DC charging facility) outside the vehicle via a part of the arms 41 and 42 of the inverter 40. The quick charger 100 is an example of an external direct-current power source.

The connector 70 is detachably connected to a connector 110 of the quick charger 100. While the connector 70 and the connector 110 are mechanically connected, a positive-electrode terminal 70a of the connector 70 and a positive-electrode terminal 101 of the quick charger 100 are electrically connected, and a negative-electrode terminal 70b of the connector 70 and a negative-electrode terminal 102 of the quick charger 100 is electrically connected. The connector 70 can also be referred to as an in-vehicle connector.

The positive-electrode wiring 71 is branched from a power supply line 44a between the first midpoint 41c and the changeover switch 51 at a first branch point 45a and is connected to the positive-electrode terminal 70a of the connector 70. However, the positive-electrode wiring 71 is provided with the changeover switch 53. The changeover switch 53 is a relay capable of switching between an open state and a closed state according to a control signal from the ECU 80. Note that, the positive-electrode wiring 71 may be provided with a reactor. The positive-electrode terminal 70a is connectable to the first midpoint 41c and the positive-electrode terminal 101 of the quick charger 100. In the connected state of the connectors 70 and 110 and the closed state of the changeover switch 53, the first midpoint 41c and the positive-electrode terminal 101 are connected via the positive-electrode terminal 70a. The positive-electrode terminal 70a is an example of a first terminal.

The negative-electrode wiring 72 is branched from a power supply line 44b between the second midpoint 42c and the changeover switch 52 at a second branch point 45b and is connected to the negative-electrode terminal 70b of the connector 70. However, the negative-electrode wiring 72 is provided with the changeover switch 54. The changeover switch 54 is a relay capable of switching between an open state and a closed state according to a control signal from the ECU 80. Note that, the negative-electrode wiring 72 may be provided with a reactor. The negative-electrode terminal 70b is connectable to the second midpoint 42c and the negative-electrode terminal 102 of the quick charger 100. In the connected state of the connectors 70 and 110 and the closed state of the changeover switch 54, the second midpoint 42c and the negative-electrode terminal 102 are connected via the negative-electrode terminal 70b. The negative-electrode terminal 70b is an example of a second terminal.

The ECU 80 includes a driving control unit 81, a charging control unit 82, and a gate drive circuit 83. The ECU 80 is an example of a control circuit.

The driving control unit 81 outputs a drive control signal for controlling opening and closing of the switching elements SW11 to SW14, SW21 to SW24, and SW31 to SW34 of the three arms 41 to 43 of the inverter 40 so as to rotate the motor generator 10. The driving control unit 81 further outputs an open/close signal for switching the open state and the closed state of the changeover switches 51 to 56.

The charging control unit 82 outputs a charging control signal for controlling opening and closing of the switching elements SW11 to SW14 and SW21 to SW24 of the two arms 41 and 42 of the inverter 40 so as to supply DC power from the quick charger 100 to charge the battery 20. The charging control unit 82 further outputs an open/close signal for switching the open state and the closed state of the changeover switches 51 to 56.

The gate drive circuit 83 outputs a gate signal for switching between opening and closing of the switching elements SW11 to SW14, SW21 to SW24, and SW31 to SW34 based on the drive control signal or the charge control signal.

The driving control unit 81 and the charging control unit 82 can be implemented by a computer. The computer includes at least a processor (circuit), a main storage unit, such as a random access memory (RAM) or a read only memory (ROM), and an auxiliary storage device, such as a hard disk drive (HDD) or a solid state drive (SSD), which are not illustrated. The processor loads and executes a program (application) stored in the ROM or the auxiliary storage device. The processor serves as the driving control unit 81 and the charging control unit 82 by operating according to the program. In this case, the program includes program modules corresponding to the driving control unit 81 and the charging control unit 82.

The program is a file in an installable format or an executable format and can be provided by being recorded in a computer-readable recording medium. The recording medium can also be referred to a program product. The program can be installed in the computer by being stored in the storage unit of the computer connected to a communication network and downloaded via the network. Alternatively, the program may be incorporated in the ROM or the like in advance.

When at least a part of the computer is implemented by hardware, the computer may include, for example, a field programmable gate array (FPGA) or an application specific integrated circuit (ASIC).

The ROM or the auxiliary storage device stores information to be used in arithmetic processing of the driving control unit 81 and the charging control unit 82. Alternatively, the information to be used in the arithmetic processing may be written in the program. The information to be used in the arithmetic processing includes, for example, the nominal voltage of the battery 20.

Operation of Inverter when Motor Generator is Driven

The inverter 40 is a three-phase three-level inverter. The operations of the three arms 41 to 43 are similar although the timings are different. Thus, the operation of the arm 41 (switching elements SW11 to SW14) on behalf of the three arms 41 to 43 is described.

The driving control unit 81 of the ECU 80 controls opening and closing of the switching elements SW11 to SW14 so that the first midpoint 41c is selectively connected to any one of the positive electrode 21 and the negative electrode 22 of the battery 20, and the voltage dividing point 30 between the first capacitor C1 and the second capacitor C2.

When the switching elements SW11 and SW12 are in the closed state and when the other switching elements SW13 and SW14 are in the open state, the first midpoint 41c and the positive electrode 21 of the battery 20 are connected via the switching elements SW11 and SW12. In this case, the current flows from the positive electrode 21 to the first midpoint 41c.

When the switching element SW12 is in the closed state, and when the other switching elements SW11, SW13, and SW14 are in the open state, the first midpoint 41c and the voltage dividing point 30 are connected via the switching element SW12 and the high-voltage-side clamp diode DC11. In this case, the current flows from the voltage dividing point 30 to the first midpoint 41c.

When the switching element SW13 is in the closed state, and when the other switching elements SW11, SW12, and SW14 are in the open state, the first midpoint 41c and the voltage dividing point 30 are electrically connected via the switching element SW13 and the low-voltage-side clamp diode DC12. In this case, the current flows from the first midpoint 41c to the voltage dividing point 30.

When the switching elements SW13 and SW14 are in the closed state, and when the other switching elements SW11 and SW12 are in the open state, the first midpoint 41c and the negative electrode 22 of the battery 20 are connected via the switching elements SW13 and SW14. In this case, the current flows from the first midpoint 41c to the negative electrode 22.

The driving control unit 81 switches, according to, for example, pulse width modulation (PWM) control, between five states including the above four states of the arm 41 and the open state of all the switching elements SW11 to SW14 and similarly switches between the five states for each of the other arms 42 and 43. Thus, the DC power of the battery 20, the first capacitor C1, and the second capacitor C2 is converted into three-phase AC power by the inverter 40 and is supplied to the motor generator 10. In this case, the line voltage is generated from the PWM pulses of the three levels of voltages; the terminal voltage Vb of the battery 20, the terminal voltage Vo1 or Vc2 (=approximately ½ of the terminal voltage Vb of the battery 20) of the first capacitor C1 or the second capacitor C2, and 0 V, and the waveform of the line voltage becomes a waveform closer to a sine wave than that of the two-level inverter.

Charging Device

The charging control unit 82 of the ECU 80 controls opening and closing of the switching elements SW11 to SW14 and the switching elements SW21 to SW24 so that DC power from the quick charger 100 is supplied to the battery 20 via the arm 41 and the arm 42 of the inverter 40. The charging device 90 mounted on an electric vehicle includes the first capacitor C1, the second capacitor C2, the arm 41, the arm 42, the power supply lines 44a and 44b, the changeover switches 51 to 56, the positive-electrode wiring 71, the negative-electrode wiring 72, the connector 70, and the charging control unit 82 and the gate drive circuit 83 of the ECU 80.

The charging device 90 is capable of charging the battery 20 in one of two charging modes; a first charging mode and a second charging mode to be described below. The charging control unit 82 maintains the changeover switches 51 and 52 in the open state and maintains the changeover switches 53 to 56 in the closed state in both the first charging mode and the second charging mode.

First Charging Mode (1)

The first charging mode is for alternately repeating the charging of the first capacitor C1 (FIG. 2) and the charging of the second capacitor C2 (FIG. 3) with the quick charger 100, thereby charging the battery 20. That is, in the first charging mode, the charging control unit 82 switches between a first state (FIG. 2) in which DC power is supplied from the quick charger 100 to the first capacitor C1 and a second state (FIG. 3) in which DC power is supplied from the quick charger 100 to the second capacitor C2. The first charging mode can also be referred to as a boost charging mode or an indirect charging mode. Note that, in addition to this first charging mode, there are other first charging modes according to other embodiments (to be described later), and these are distinguished by adding a suffix for each embodiment, such as a first charging mode (1), a first state (1), and a second state (1), in the following description.

First State (1)

Figure 2:
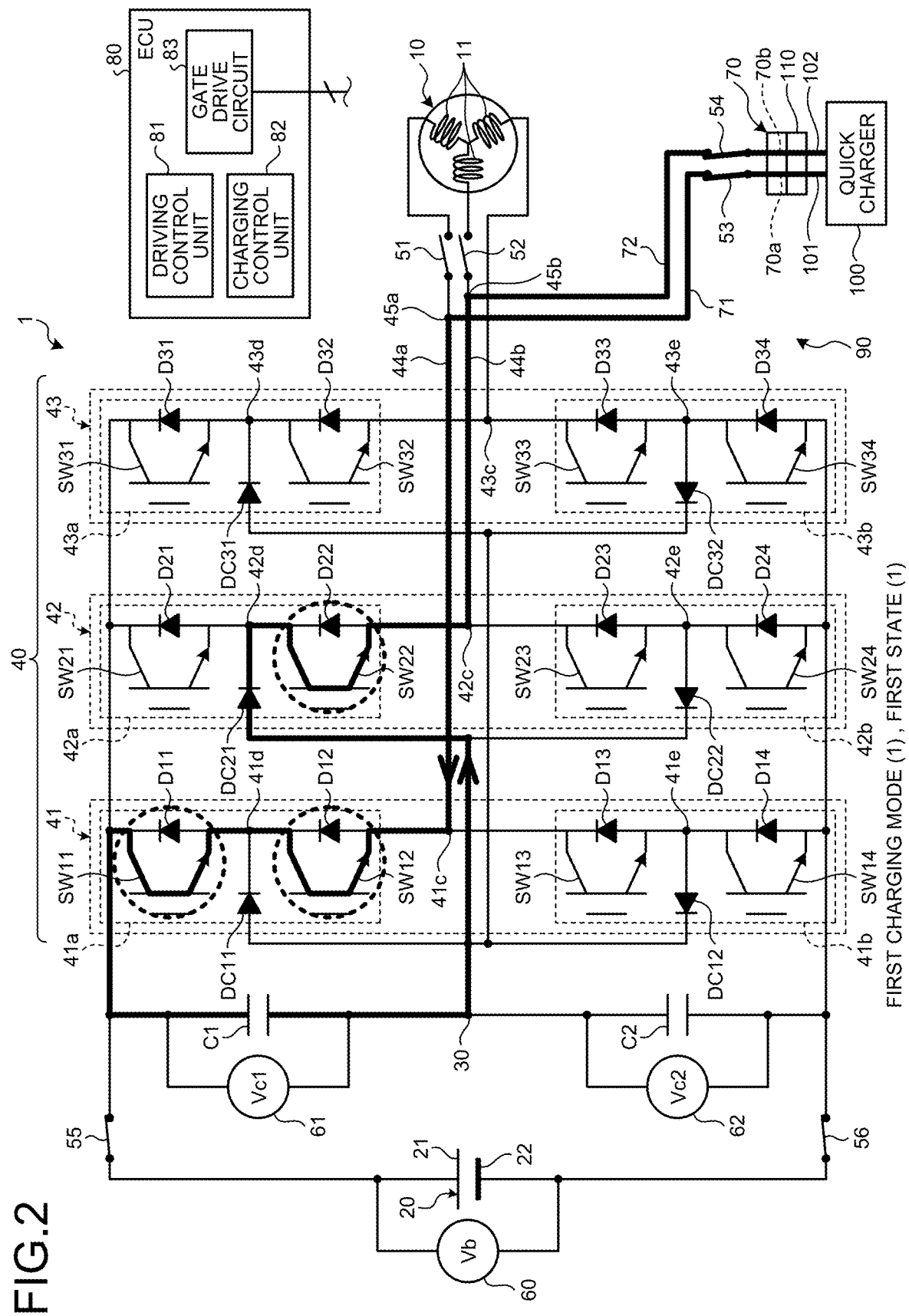
FIG. 2 is an explanatory diagram illustrating a charging path in a first state (1)

FIG. 2 is an explanatory diagram illustrating a charging path in the first state (1). In each of the circuit diagrams illustrated in FIG. 2 and subsequent drawings, thick lines indicate current paths, and the switching elements SW11 to SW14 and SW21 to SW24 in the closed state are marked with broken-line circles. Note that, the switching elements SW11 to SW14 and SW21 to SW24 in the open state are not marked with broken-line circles.

In the first state (1), the first midpoint 41c and the positive electrode of the first capacitor C1 (the positive electrode 21 of the battery 20) are connected, and the second midpoint 42c and the negative electrode of the first capacitor C1 (the voltage dividing point 30 between the first capacitor C1 and the second capacitor C2) are connected. In order to achieve the first state (1), the charging control unit 82 controls the switching elements SW11, SW12, and SW22 to be in the closed state and controls the switching elements SW13, SW14, SW21, SW23, and SW24 to be in the open state. Thus, the positive electrode of the first capacitor C1 and the positive-electrode terminal 101 of the quick charger 100 are connected, the negative electrode of the first capacitor C1 and the negative-electrode terminal 102 of the quick charger 100 are connected, and the first capacitor C1 is rapidly charged by the quick charger 100.

Second State (1)

Figure 3:
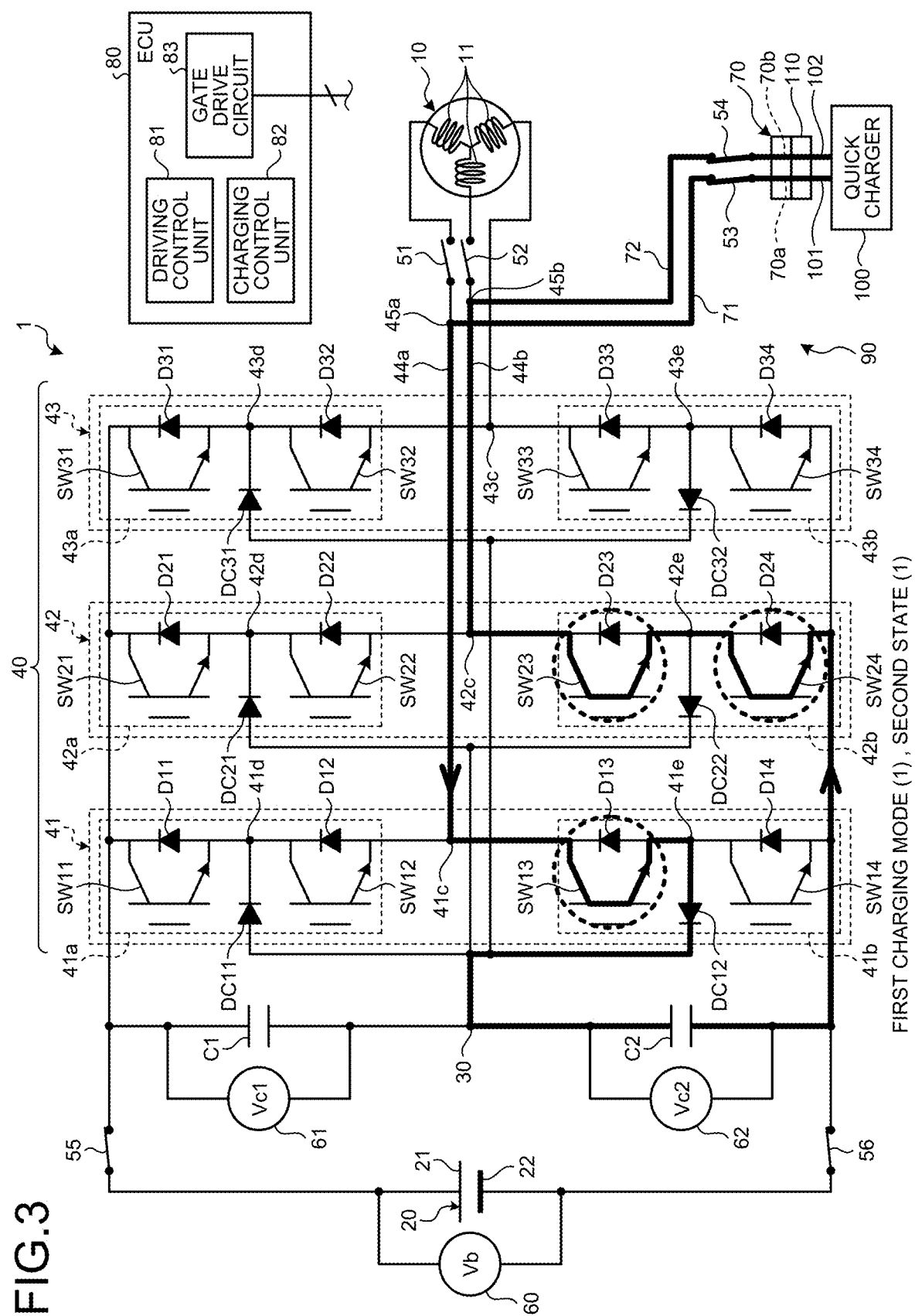
FIG. 3 is an explanatory diagram illustrating a charging path in a second state (1)

FIG. 3 is an explanatory diagram illustrating a charging path in a second state (1). In the second state (1), the first midpoint 41c and the positive electrode of the second capacitor C2 (the voltage dividing point 30) are connected, and the second midpoint 42c and the negative electrode of the second capacitor C2 (the negative electrode 22 of the battery 20) are connected. In order to achieve the second state (1), the charging control unit 82 controls the switching elements SW13, SW23, and SW24 to be in the closed state, and the switching elements SW11, SW12, SW14, SW21, and SW22 to be in the open state. Thus, the positive electrode of the second capacitor C2 and the positive-electrode terminal 101 of the quick charger 100 are connected, the negative electrode of the second capacitor C2 and the negative-electrode terminal 102 of the quick charger 100 are connected, and the second capacitor C2 is charged by the quick charger 100.

The charging device 90 gradually increases, by alternately repeating the first state and the second state, the time average value of the terminal voltage Vc1 of the first capacitor C1 and the terminal voltage Vc2 of the second capacitor C2 (for example, the time average value in a control cycle to be described later), thereby charging the battery 20. When the sum of the terminal voltage Vc1 of the first capacitor C1 and the terminal voltage Vc2 of the second capacitor C2 is greater than the terminal voltage Vb of the battery 20, the battery 20 is charged by the first capacitor C1 and the second capacitor C2.

With this first charging mode, although the maximum output voltage Vmax (for example, 400 V) of the quick charger 100 is lower than the nominal voltage Vb0 (for example, 800 V) of the battery 20, the time average value of the terminal voltage Vc1 of the first capacitor C1 and the terminal voltage Vc2 of the second capacitor C2 can be gradually increased by alternately charging the first capacitor C1 and the second capacitor C2 when the maximum output voltage Vmax (400 V) is equal to or greater than half of the nominal voltage Vb0 (800 V), thereby charging the battery 20.

Control for Determining Times in First State and Second State

In the first charging mode, the charging control unit 82 controls the determination of a charging time t1 for the first capacitor C1 and a charging time t2 of the second capacitor C2 so as to reduce the difference between the terminal voltage Vc1 for the first capacitor C1 and the terminal voltage Vc2 of the second capacitor C2.

Figure 4:
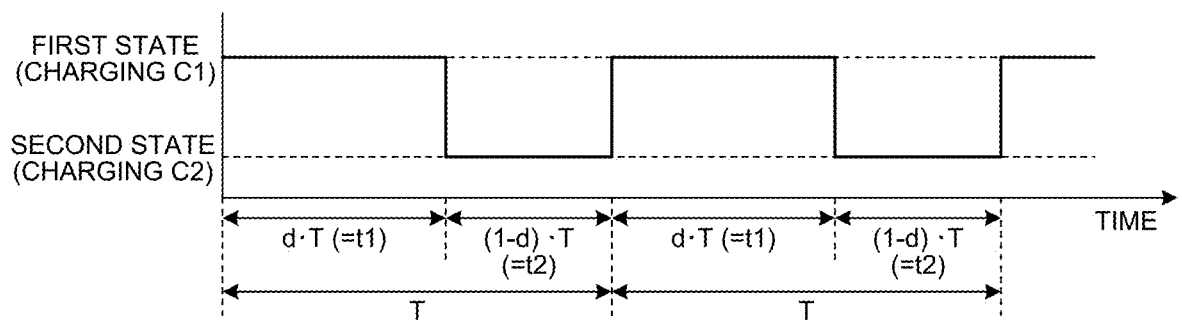
FIG. 4 is an explanatory diagram illustrating an example of switching control between the first state and the second state.

FIG. 4 is an explanatory diagram (timing chart) illustrating an example of switching control between the first state in which the first capacitor C1 is charged and the second state in which the second capacitor C2 is charged. As illustrated in FIG. 4, here, the charging control unit 82 determines, for example, that a time (cycle T) in which the first state and the second state are each executed once is fixed, that the charging time t1 in the first state is d×T (where, d: duty ratio and 0<d<1), and that the charging time t2 in the second state is (1−d)×T, and calculates d with the following expression (A).

$$d = Kp \cdot (Vc2 - Vc1) + Ki \cdot \int (Vc2 - Vc1) dt \qquad (A)$$

In the expression (A), Vc1 and Vc2 are functions of time t, and Kp and Ki are coefficients set appropriately. Kp can also be referred to as a proportional gain, and Ki can also be referred to as an integral gain. The cycle T is set to, for example, equal to or less than 1 ms. In addition, d×T is set to, for example, an integral multiple of the clock cycle of the ECU 80.

This expression (A) is an example of feedback control for reducing the difference between the terminal voltage Vo1 of the first capacitor C1 and the terminal voltage Vc2 of the second capacitor C2 (Vc2-Vc1, deviation), and an example of PI control. However, the control with the expression (A) is an example, and the control may be performed with another method.

Figure 5:
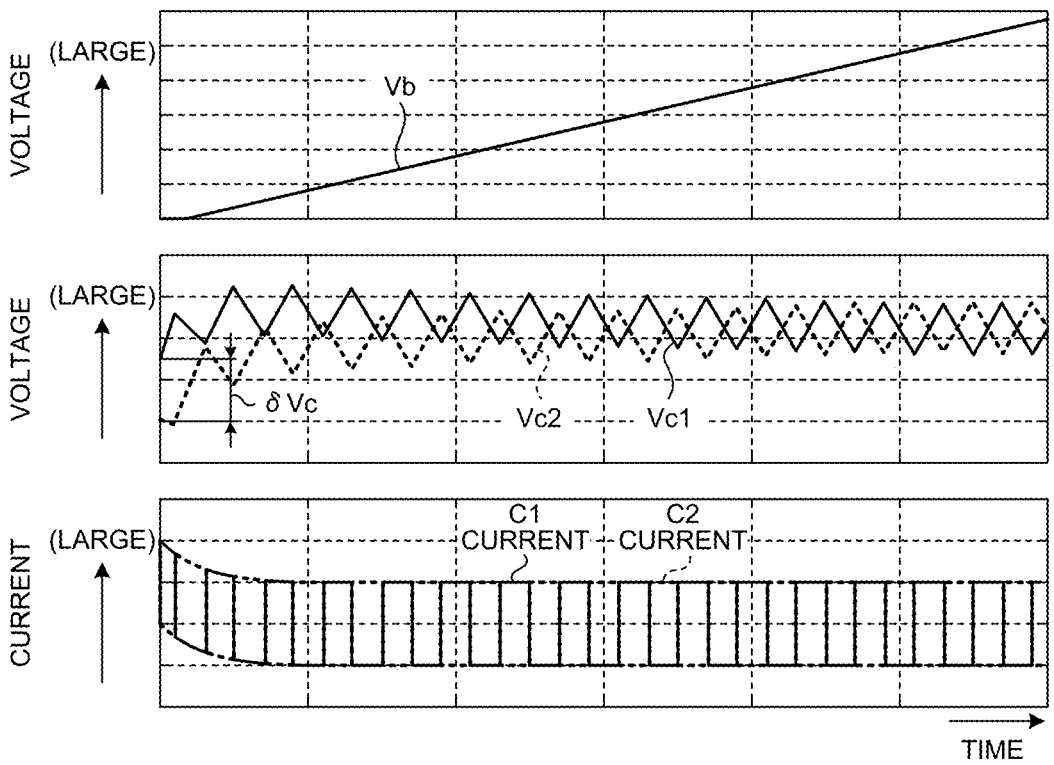
FIG. 5 is a diagram illustrating changes in Vb, Vc1, Vc2, C1 current, and C2 current over time during charging in a first charging mode according to an expression (A)
Figure 6:
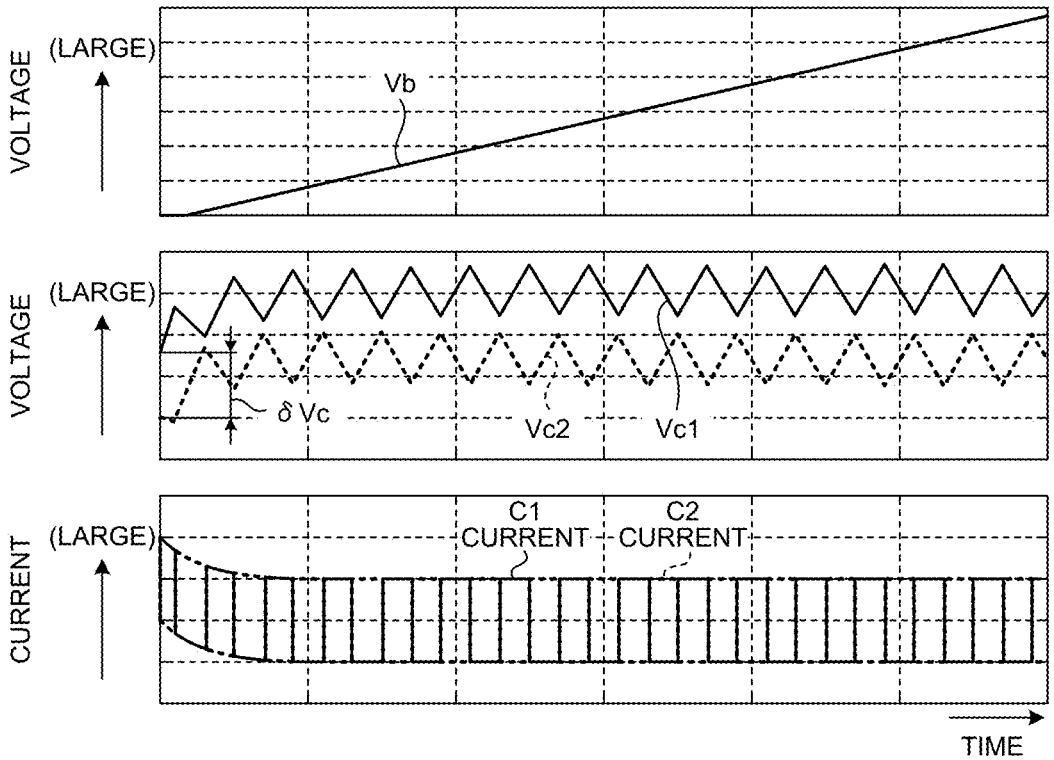
FIG. 6 is a diagram illustrating changes in Vb, Vc1, Vc2, C1 current, and C2 current over time when t1=t2 is fixed in the first charging mode.

FIG. 5 is a diagram illustrating, in the charging according to the expression (A) in the first charging mode, changes in the terminal voltage Vb of the battery 20, the terminal voltage Vo1 of the first capacitor C1, the terminal voltage Vc2 of the second capacitor C2, the current flowing through the first capacitor C1 (C1 current), and the current flowing through the second capacitor C2 (C2 current) over time. FIG. 6 is a diagram illustrating, when the control according to the expression (A) is not performed, and when the charging time t1 in the first state and the charging time t2 in the second state are the same (t1=t2) and fixed in the first charging mode (a comparative example), changes in the terminal voltage Vb of the battery 20, the terminal voltage Vo1 of the first capacitor C1, the terminal voltage Vc2 of the second capacitor C2, the current flowing through the first capacitor C1 (C1 current), and the current flowing through the second capacitor C2 (C2 current) over time. The charging time t1 is an example of a first charging time, and the charging time t2 is an example of a second charging time. In FIGS. 5 and 6, δVc is the difference between the terminal voltage Vo1 of the first capacitor C1 and the terminal voltage Vc2 of the second capacitor C2. In FIGS. 5 and 6, the difference δVc is greater than 0 at the start of the charging and the difference δVc is the same, as an example.

It is apparent from comparison between FIGS. 5 and 6 that, in both cases, the change in the terminal voltage Vb of the battery 20 over time, that is, the increasing rate of the terminal voltage Vb due to charging of the battery 20 is similar. However, as illustrated in FIG. 6, when the charging time t1 in the first state and the charging time t2 in the second state are the same (t1=t2) and fixed, the time average value of the difference δVc between the terminal voltage Vo1 of the first capacitor C1 and the terminal voltage Vc2 of the second capacitor C2 (for example, the time average value for one control cycle) is hardly reduced. In contrast, as illustrated in FIG. 5, with the charging according to the expression (A), the time average value of the difference δVc between the terminal voltage Vo1 of the first capacitor C1 and the terminal voltage Vc2 of the second capacitor C2 is reduced over time. As illustrated in FIG. 6, if the difference δVc between the terminal voltage Vc1 of the first capacitor C1 and the terminal voltage Vc2 of the second capacitor C2 is relatively large, a more accurate waveform of the line voltage, that is, a waveform closer to a sine wave is hardly generated in the inverter 40. In this regard, the charging control unit 82 controls the determination of the charging time t1 for the first capacitor C1 and the charging time t2 for the second capacitor C2 so as to reduce the difference δVc between the terminal voltage Vc1 of the first capacitor C1 and the terminal voltage Vc2 of the second capacitor C2 in the present embodiment, and the difference δVc between the terminal voltage Vc1 of the first capacitor C1 and the terminal voltage Vc2 of the second capacitor C2 can be reduced, thereby easily generating a more accurate waveform of the line voltage in the inverter 40.

Second Charging Mode

Figure 7:
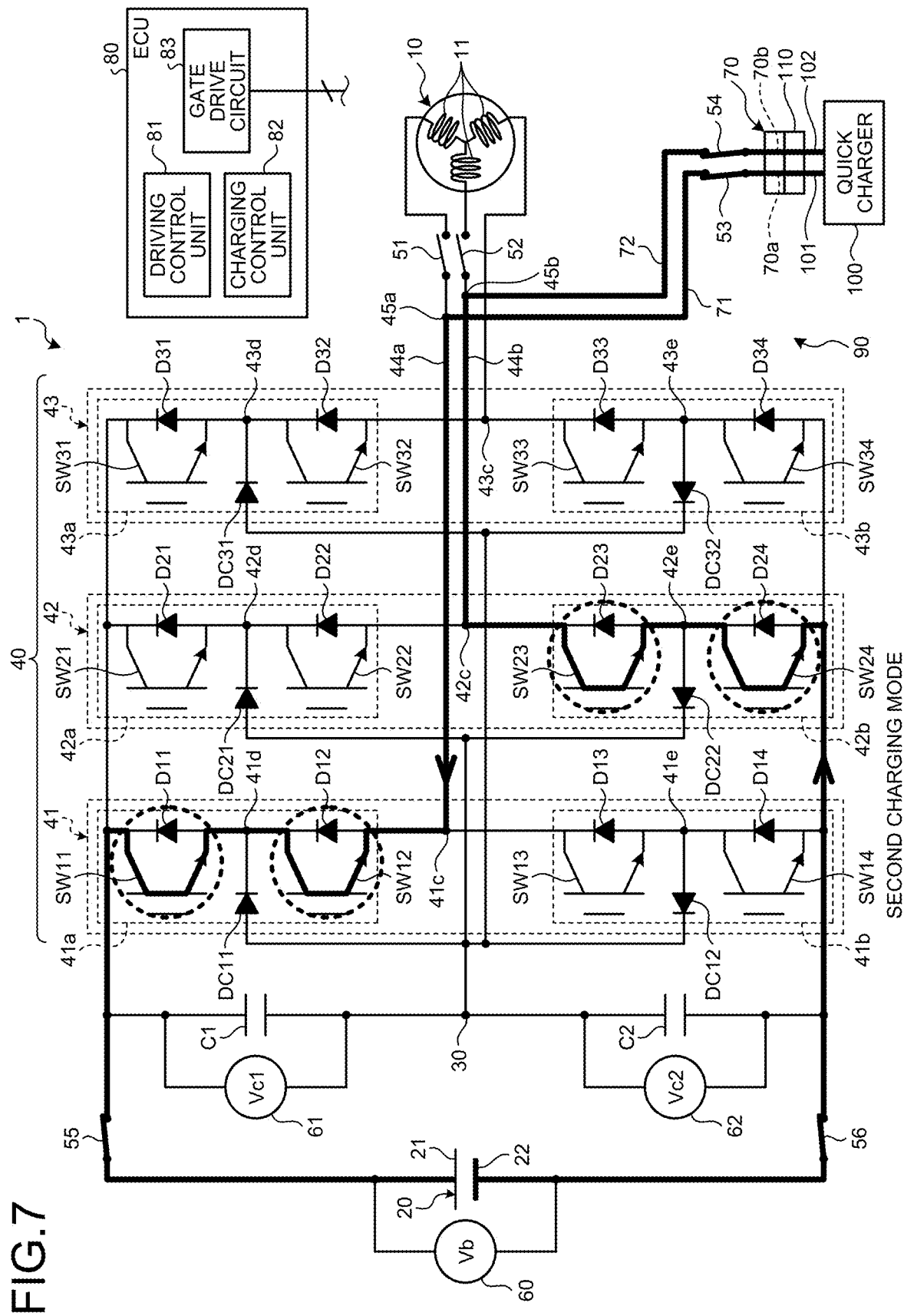
FIG. 7 is an explanatory diagram illustrating a charging path in the second state.

FIG. 7 is an explanatory diagram illustrating a charging path in a second state. The second charging mode is for directly charging the battery 20 from the quick charger 100. The second charging mode can be referred to as a direct charging mode.

In the second charging mode, the first midpoint 41c and the positive electrode 21 of the battery 20 are connected, and the second midpoint 42c and the negative electrode 22 of the battery 20 are connected. In order to achieve the second charging mode, the charging control unit 82 controls the switching elements SW11, SW12, SW23, and SW24 to be in the closed state and controls the switching elements SW13, SW14, SW21, and SW22 to be in the open state. Thus, the positive electrode 21 of the battery 20 and the positive-electrode terminal 101 of the quick charger 100 are connected, the negative electrode 22 of the battery 20 and the negative-electrode terminal 102 of the quick charger 100 are connected, and the battery 20 is charged by the quick charger 100.

With this second charging mode, when the maximum output voltage Vmax of the quick charger 100 is substantially the same as or greater than the nominal voltage Vb0 of the battery 20, for example, when the maximum output voltage Vmax of the quick charger 100 is 800 V, and when the nominal voltage Vb0 of the battery 20 is 800 V, the battery 20 can be charged more quickly.

In the second charging mode, the switching elements SW11, SW12, SW23, and SW24 that are controlled to be in the closed state are provided with freewheeling diodes D11, D12, D23, and D24 respectively, and the charging current can flow through the freewheeling diodes D11, D12, D23, and D24. Thus, when charging with the current flowing through the freewheeling diodes D11, D12, D23, and D24 is sufficient, for example, when the battery 20 can be charged in a sufficiently short time, the switching elements SW11, SW12, SW23, and SW24 may be controlled to be in the open state. That is, the charging control unit 82 may control all the switching elements SW11 to SW14 and SW21 to SW24 to be in the open state in the second charging mode.

Charging Control Procedure

Figure 8:
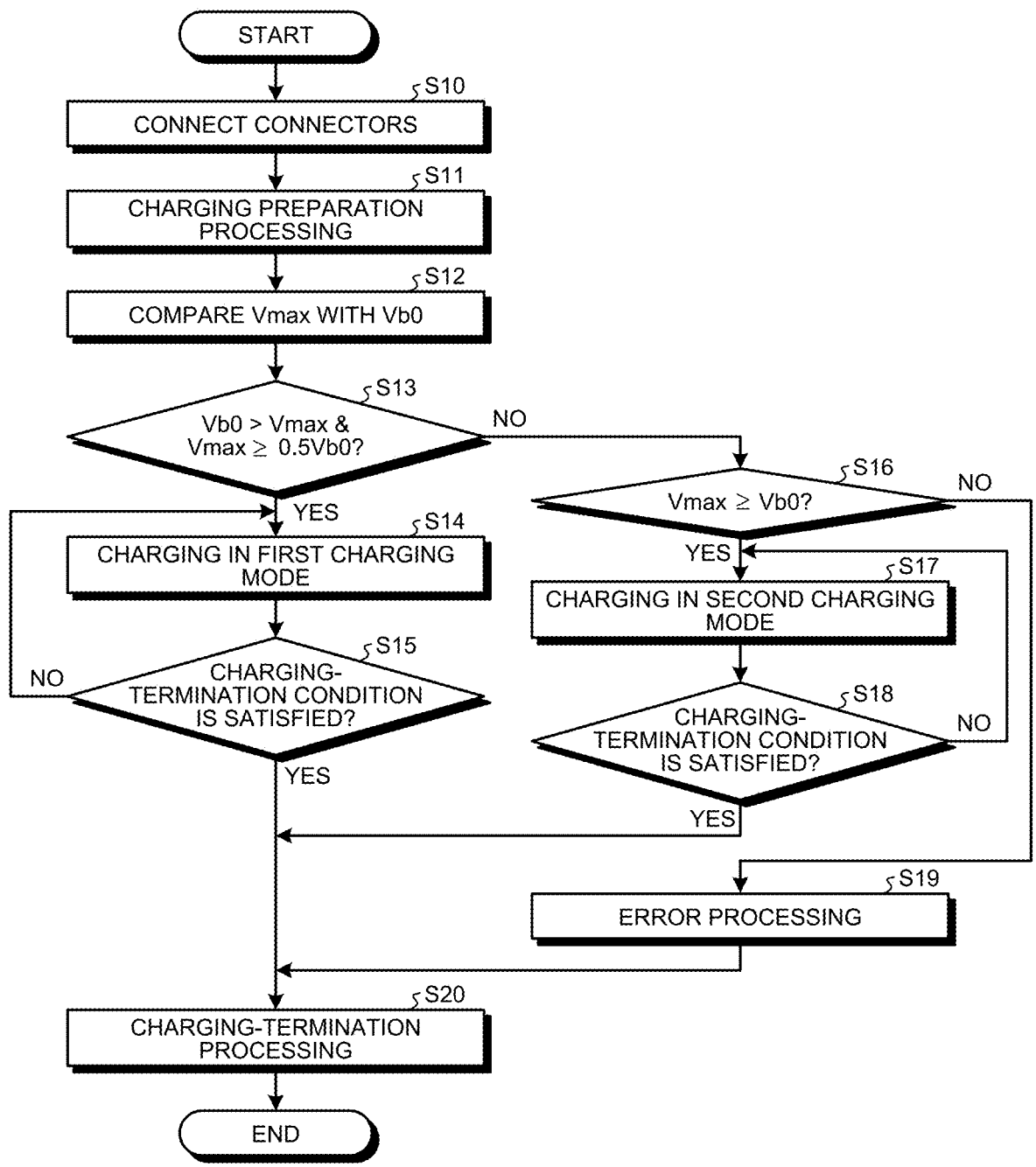
FIG. 8 is a flowchart illustrating an example of a charging control procedure of a charging device and a quick charger.

FIG. 8 is a flowchart illustrating an example of a charging control procedure of the charging device 90 and the quick charger 100. As illustrated in FIG. 8, when connectors 70 and 110 are connected to each other (S10), charging preparation processing is performed in the charging device 90 of the electric vehicle and the quick charger 100 (S11). In S11, for example, the quick charger 100 transmits information indicating the maximum output voltage Vmax of the quick charger 100 to the ECU 80 by wire or wirelessly, and the charging control unit 82 receives the information. The charging control unit 82 further controls the changeover switches 51 and 52 to be in the open state and controls the changeover switches 53 to 56 to be in the closed state.

Next, the charging control unit 82 compares the maximum output voltage Vmax of the quick charger 100 with the nominal voltage Vb0 of the battery 20 (S12). In this comparison in S12, when the maximum output voltage Vmax of the quick charger 100 is lower than the nominal voltage Vb0 of the battery 20 and is equal to or greater than half of the nominal voltage Vb0 of the battery 20 (Yes in S13), the charging control unit 82 controls the switching elements SW11 to SW14 and SW21 to SW24 to be in the open state or the closed state so that the battery 20 is charged by the quick charger 100 in the first charging mode (S14). When a predetermined charging-termination condition is satisfied (Yes in S15), the charging in the first charging mode (S14) is terminated, and the procedure proceeds to S20. The charging-termination condition in S15 is, for example, that the terminal voltage Vb of the battery 20 is equal to or greater than a predetermined threshold, and that the difference δVc between the terminal voltage Vc1 of the first capacitor C1 and the terminal voltage Vc2 of the second capacitor C2 (or the time average value of the difference δVc for one control cycle) is less than or equal to a predetermined threshold value. Unless the charging-termination condition is satisfied (No in S15), the charging in the first charging mode (S14) is continued.

In addition, in the comparison in S12, when the maximum output voltage Vmax of the quick charger 100 is equal to or greater than the nominal voltage Vb0 of the battery 20 (No in S13 and Yes in S16), the charging control unit 82 controls the open state and the closed state of the switching elements SW11 to SW14 and SW21 to SW24 so that the battery 20 is charged by the quick charger 100 in the second charging mode (S17). When a predetermined charging-termination condition is satisfied (Yes in S18), the charging in the second charging mode (S17) is terminated, and the procedure proceeds to S20. The charging-termination condition in S18 is, for example, that the terminal voltage Vb of the battery 20 is equal to or greater than a predetermined threshold value. Unless the charging-termination condition is satisfied (No in S18), the charging in the second charging mode (S17) is continued.

In the case of No in S13 and No in S16, the charging control unit 82 performs error processing (S19). In S19, for example, the charging control unit 82 controls a display output unit or a voice output unit (not illustrated) provided in the electric vehicle to output a notification indicating that the charging cannot be performed, or transmits information indicating that the charging cannot be performed to the quick charger 100. After S19, the procedure proceeds to S20.

In S20, the charging control unit 82 performs charging-termination processing. In S20, for example, the charging control unit 82 controls the changeover switches 53 to 56 to be in the open state and controls the changeover switches 51 and 52 to be in the closed state. The charging control unit 82 further controls the switching elements SW11 to SW14 and SW21 to SW24 to be in the open state.

As described above, in the present embodiment, while the first midpoint 41c and the positive-electrode terminal 101 of the quick charger 100 (an external direct-current power source) are connected via the positive-electrode terminal 70a (a first terminal), while the second midpoint 42c and the negative-electrode terminal 102 of the quick charger 100 are connected via the negative-electrode terminal 70b (a second terminal), and while the changeover switch 51 (a first changeover switch) and the changeover switch 52 (a second changeover switch) are in the open state, the ECU 80 (a control circuit) controls opening and closing of the switching elements SW11 to SW14 (first switching elements) and the switching elements SW21 to SW24 (second switching elements) to charge the first capacitor C1, the second capacitor C2, and the battery 20 (a storage battery) in the first charging mode in which the first state, in which the first midpoint 41c and the positive electrode 21 are connected and the second midpoint 42c and the voltage dividing point 30 are connected to charge the first capacitor C1 with the quick charger 100, and the second state, in which the first midpoint 41c and the voltage dividing point 30 are connected and the second midpoint 42c and the negative electrode 22 are connected to charge the second capacitor C2 with the quick charger 100, are alternately switched.

With this configuration and control, although the maximum output voltage Vmax of the quick charger 100 is lower than the nominal voltage Vb0 of the battery 20, the charging device 90 can charge the battery 20 by alternately charging the first capacitor C1 and the second capacitor C2 with DC power of the quick charger 100 when the maximum output voltage Vmax of the quick charger 100 is equal to or greater than half of the nominal voltage Vb0 of the battery 20.

In addition, according to the present embodiment, by effectively using the three-level inverter 40 including the first capacitor C1 and the second capacitor C2 whose terminal voltages Vc1 and Vc2 are approximately half the terminal voltage Vb of the battery 20, the quick charger 100 whose maximum output voltage Vmax is lower than the nominal voltage Vb0 of the battery 20 can charge the battery 20. This allows the electric vehicle to charge the battery 20 with more quick chargers 100. In other words, the versatility of the electric vehicle for the quick charger 100 can be enhanced.

In addition, according to the present embodiment, when the terminal voltages Vc1 and Vc2 of the first capacitor C1 and the second capacitor C2 are approximately half the terminal voltage Vb of the battery 20, and when the maximum output voltage Vmax of the quick charger 100 is approximately half the nominal voltage Vb0 of the battery 20, the difference between the terminal voltage Vc1 or Vc2 of the first capacitor C1 or the second capacitor C2 to be charged and the terminal voltage between the positive-electrode terminal 101 and the negative-electrode terminal 102 of the quick charger 100 is reduced in each of the first state and the second state, and the current ripple in the charging current is reduced. Thus, the reactor for suppressing the current ripple in the positive-electrode wiring 71 and the negative-electrode wiring 72 can be reduced or eliminated, thereby compactly configuring the charging device 90, and this can further reduce the labor and cost of manufacturing.

In addition, according to the present embodiment, by using, for charging, the switching elements SW11 to SW14 and SW21 to SW24 included in the inverter 40, the charging device 90 can be more compactly configured compared to the case in which switching elements are separately provided, thereby further reducing the labor and cost of manufacturing the charging device 90. If switching elements are separately provided, a mechanism for cooling the switching elements is also required, but such a mechanism is not necessary according to the present embodiment.

In addition, according to the present embodiment, by setting the changeover switches 51 and 52 to be in the open state during charging, the motor generator 10 can be prevented from rotating with the electric power supplied from the quick charger 100, thereby preventing the electric vehicle from moving.

In addition, in the present embodiment, the ECU 80 controls, when the maximum output voltage Vmax of the quick charger 100 is equal to or greater than the nominal voltage Vb0 of the battery 20 (a storage battery), opening and closing of the switching elements SW11 to SW14 and the switching elements SW21 to SW24 to charge the battery 20 with the quick charger 100 in the second charging mode, in which the first midpoint 41c and the positive electrode 21 are connected and the second midpoint 42c and the negative electrode 22 are connected, while the first midpoint 41c and the positive-electrode terminal 101 of the quick charger 100 are connected via the positive-electrode terminal 70a, while the second midpoint 42c and the negative-electrode terminal 102 of the quick charger 100 are connected via the negative-electrode terminal 70b, and while the changeover switch 51 and the changeover switch 52 are in the open state.

With this configuration and control, when the maximum output voltage Vmax of the quick charger 100 is equal to or greater than the nominal voltage Vb0 of the battery 20, the charging device 90 can more quickly charge the battery 20 with DC power of the quick charger 100.

In addition, the open state and the closed state of the switching elements SW11 to SW14 and SW21 to SW24 are not switched during charging in the second charging mode, and the loss caused by switching can be reduced. That is, charging can be more efficiently performed.

In addition, in the present embodiment, the ECU 80 controls, in the first charging mode, determination of the charging time t1 (a first charging time) in the first state and the charging time t2 (a second charging time) in the second state to reduce so that the difference δVc between the terminal voltages Vo1 and Vc2 of the first capacitor C1 and the second capacitor C2 is reduced.

With this configuration and control, the difference δVc between the terminal voltage Vo1 of the first capacitor C1 and the terminal voltage Vc2 of the second capacitor C2 can be further reduced, thereby easily generating a more accurate waveform of the line voltage in the inverter 40 while the motor generator 10 is driven.

Second Embodiment

In the present embodiment, a charging device 90 alternately charges a first capacitor C1 and a second capacitor C2 in a first charging mode (2) different from that in the first embodiment, thereby charging a battery 20. The charging device 90 is capable of performing charging in the first charging mode (2) instead of the first charging mode (1). Although the configuration of a vehicle drive system 1 is the same as that in the first embodiment, an ECU 80 has a different mode for controlling switching elements SW11 to SW14 and SW21 to SW24 from that in the first embodiment, and a current path in arms 41 and 42 is different from that in the first embodiment.

First State (2)

Figure 9:
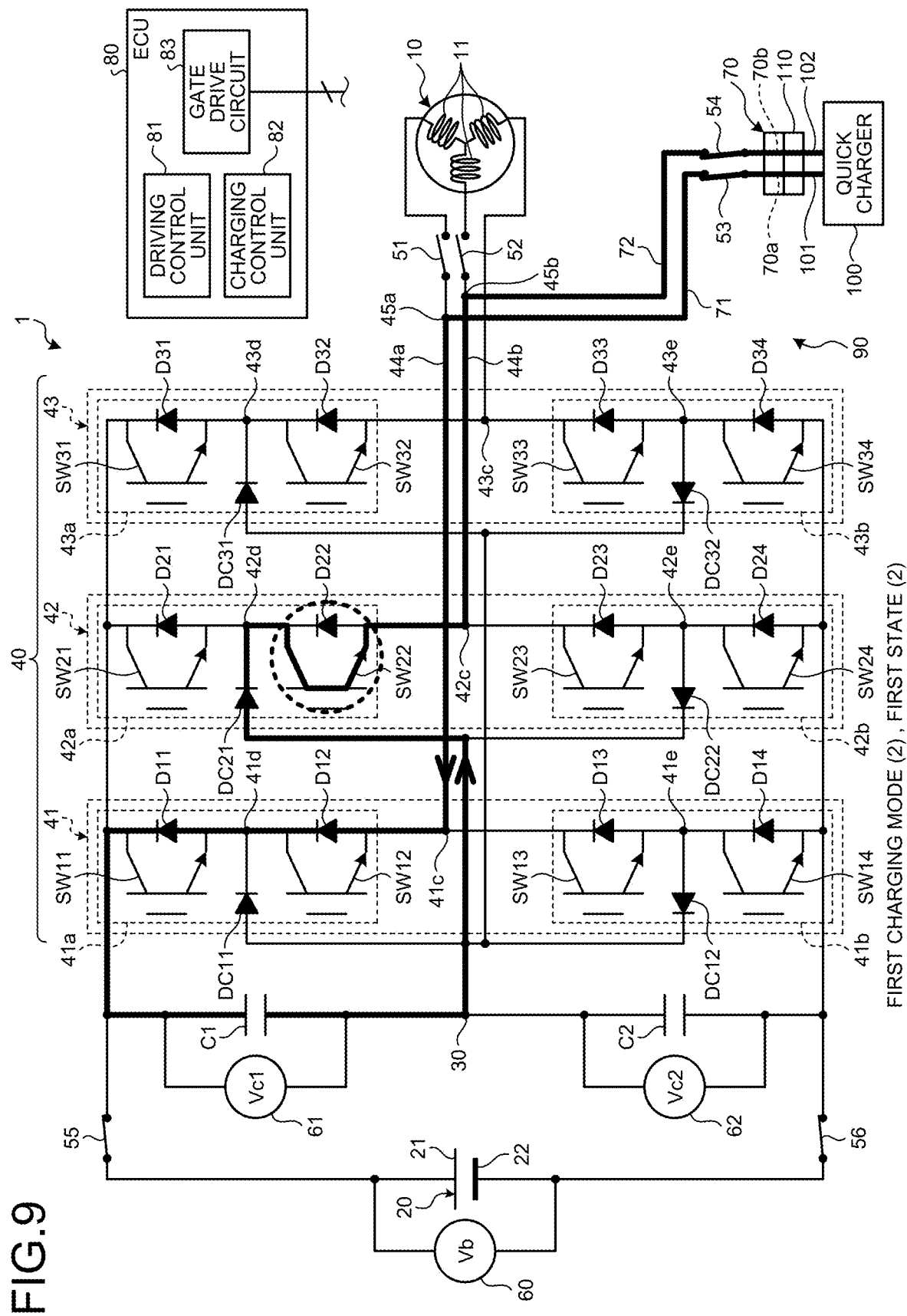
FIG. 9 is an explanatory diagram illustrating a charging path in a first state (2)

FIG. 9 is an explanatory diagram illustrating a charging path in a first state (2). In the first state (2), similarly to the first state (1), a first midpoint 41c and the positive electrode of a first capacitor C1 (a positive electrode 21 of the battery 20) are connected, and a second midpoint 42c and the negative electrode of the first capacitor C1 (a voltage dividing point 30) are connected. However, in the first state (2) in the present embodiment, the switching elements SW11 and SW12 of an upper arm 41a are controlled to be in an open state. In this case, the current flows from the first midpoint 41c to the positive electrode of the first capacitor C1 via freewheeling diodes D1l and D12 provided in parallel with the switching elements SW11 and SW12 instead of the switching elements SW11 and SW12 in the open state. A charging control unit 82 controls the switching element SW22 to be in a closed state and controls the switching elements SW13, SW14, SW21, SW23, and SW24 in addition to the switching elements SW11 and SW12 to be in the open state. Thus, the positive electrode of the first capacitor C1 and the positive-electrode terminal 101 of the quick charger 100 are connected, the negative electrode of the first capacitor C1 and the negative-electrode terminal 102 of the quick charger 100 are connected, and the first capacitor C1 is charged by the quick charger 100. The freewheeling diodes D11 and D12 are examples of first freewheeling diodes.

Second State (2)

Figure 10:
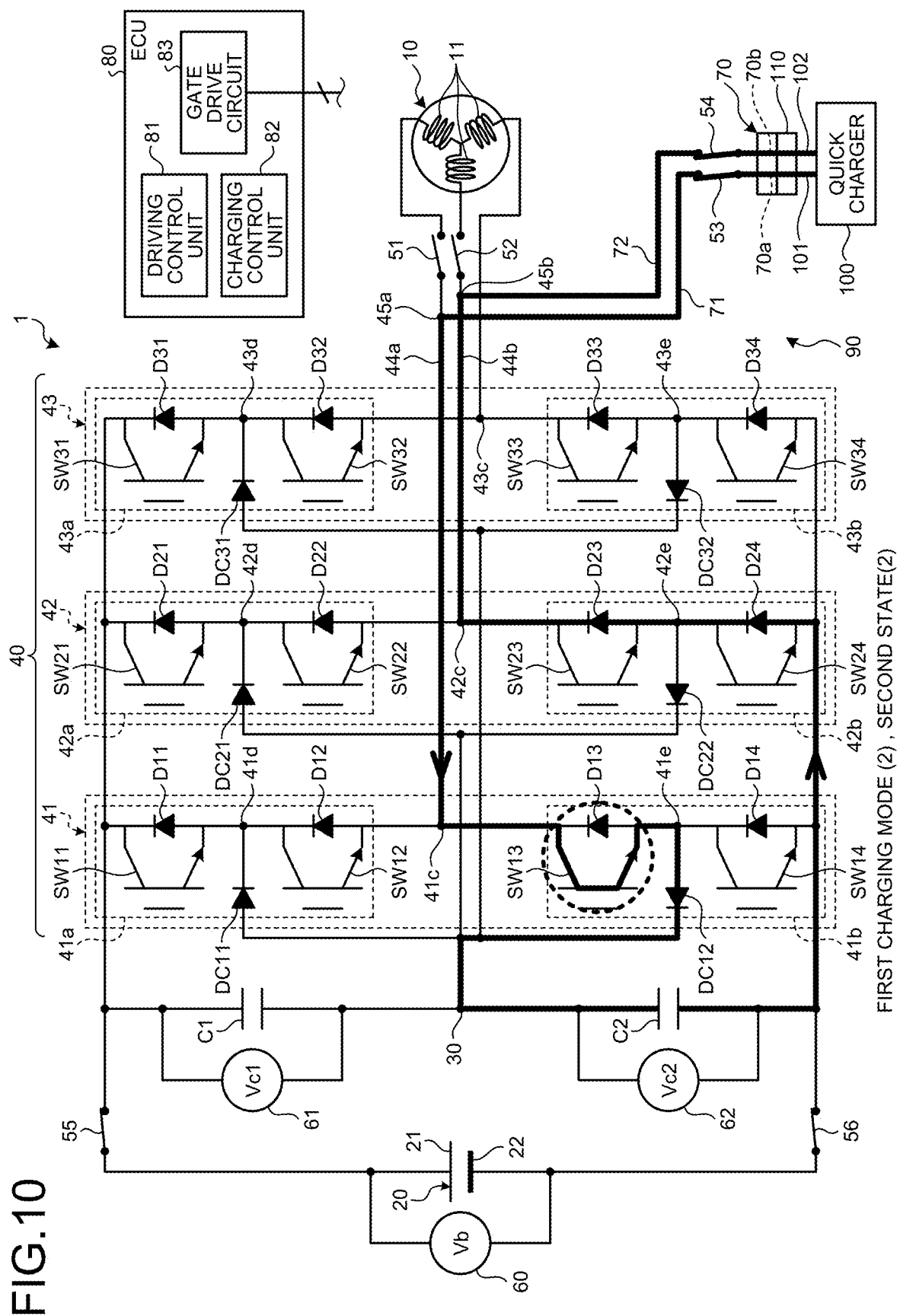
FIG. 10 is an explanatory diagram illustrating a charging path in a second state (2)

FIG. 10 is an explanatory diagram illustrating a charging path in a second state (2). In the second state (2), similar to the second state (1), the first midpoint 41c and the positive electrode of the second capacitor C2 (the voltage dividing point 30) are connected, and the second midpoint 42c and the negative electrode of the second capacitor C2 (a negative electrode 22 of the battery 20) are connected. However, in the second state (2) in the present embodiment, the switching elements SW23 and SW24 of a lower arm 42b are controlled to be in the open state. In this case, the current flows from the negative electrode of the second capacitor C2 to the second midpoint 42c via freewheeling diodes D24 and D23 provided in parallel with the switching elements SW24 and SW23 instated of the switching elements SW24 and SW23 in the open state. The charging control unit 82 controls the switching element SW13 to be in the closed state and controls the switching elements SW11, SW12, SW14, SW21, and SW22 in addition to the switching elements SW23 and SW24 to be in the open state. Thus, the positive electrode of the second capacitor C2 and the positive-electrode terminal 101 of the quick charger 100 are connected, the negative electrode of the second capacitor C2 and the negative-electrode terminal 102 of the quick charger 100 are connected, and the second capacitor C2 is charged by the quick charger 100. The freewheeling diodes D23 and D24 are examples of second freewheeling diodes.

Note that, the ECU 80 may change the first state (2) to the first state (1). Alternatively, the ECU 80 may change the second state (2) to the second state (1). In addition, the ECU 80 may control the switching elements SW11 and SW12 so that one of the switching elements SW11 and SW12 is in the open state and the other is in the closed state in the first state (2). Alternatively, the ECU 80 may control the switching elements SW23 and SW24 so that one of the switching elements SW23 and SW24 is in the open state and the other is in the closed state in the second state (2).

As described above, in the present embodiment, the freewheeling diodes D11 and D12 (first freewheeling diodes) are provided in parallel with the switching elements SW11 and SW12 of the upper arm 41a (a first upper arm) respectively, and the ECU 80 (a control circuit) controls the switching elements SW11 and SW12 in parallel with the freewheeling diodes D11 and D21 respectively to be in the open state.

In addition, in the present embodiment, the freewheeling diodes D23 and D24 (second freewheeling diodes) are provided in parallel with the switching elements SW23 and SW24 of the lower arm 42b (a second lower arm) respectively, and the ECU 80 (the control circuit) controls the switching elements SW23 and SW24 in parallel with the freewheeling diodes D23 and D24 to be in the open state.

With this configuration and control, the number of the switching elements SW11 to SW14 and SW21 to SW24 that switch between the open state and the closed state in the first state (2) and the second state (2) can be reduced, and the loss caused by switching between the open state and the closed state of the switching elements SW11 to SW14 and SW21 to SW24 can be reduced. That is, charging can be more efficiently performed.

Third Embodiment

In the present embodiment, a charging device 90 alternately charges a first capacitor C1 and a second capacitor C2 in a first charging mode (3) different from those in the first and second embodiments, thereby charging a battery 20. The charging device 90 performs charging in the first charging mode (3) instead of the first charging mode (1) or the first charging mode (2). The configuration of a vehicle drive system 1 is the same as that in the first embodiment, and a current path in arms 41 and 42 are the same as that in the first embodiment, but open and closed states of switching elements SW11 to SW14 and SW21 to SW24 by an ECU 80 are different from those in the first embodiment. In the present embodiment, the ECU 80 controls the open state and the closed state of the switching elements SW11 to SW14 and SW21 to SW24 so that either one of switching elements that are not involved in the current path in the arms 41 and 42, that is, either one of the switching element SW11 and the switching element SW12, or either one of the switching element SW23 and the switching element SW24 is to be in the closed state in both the first state (3) and the second state (3).

First State (3)

Figure 11:
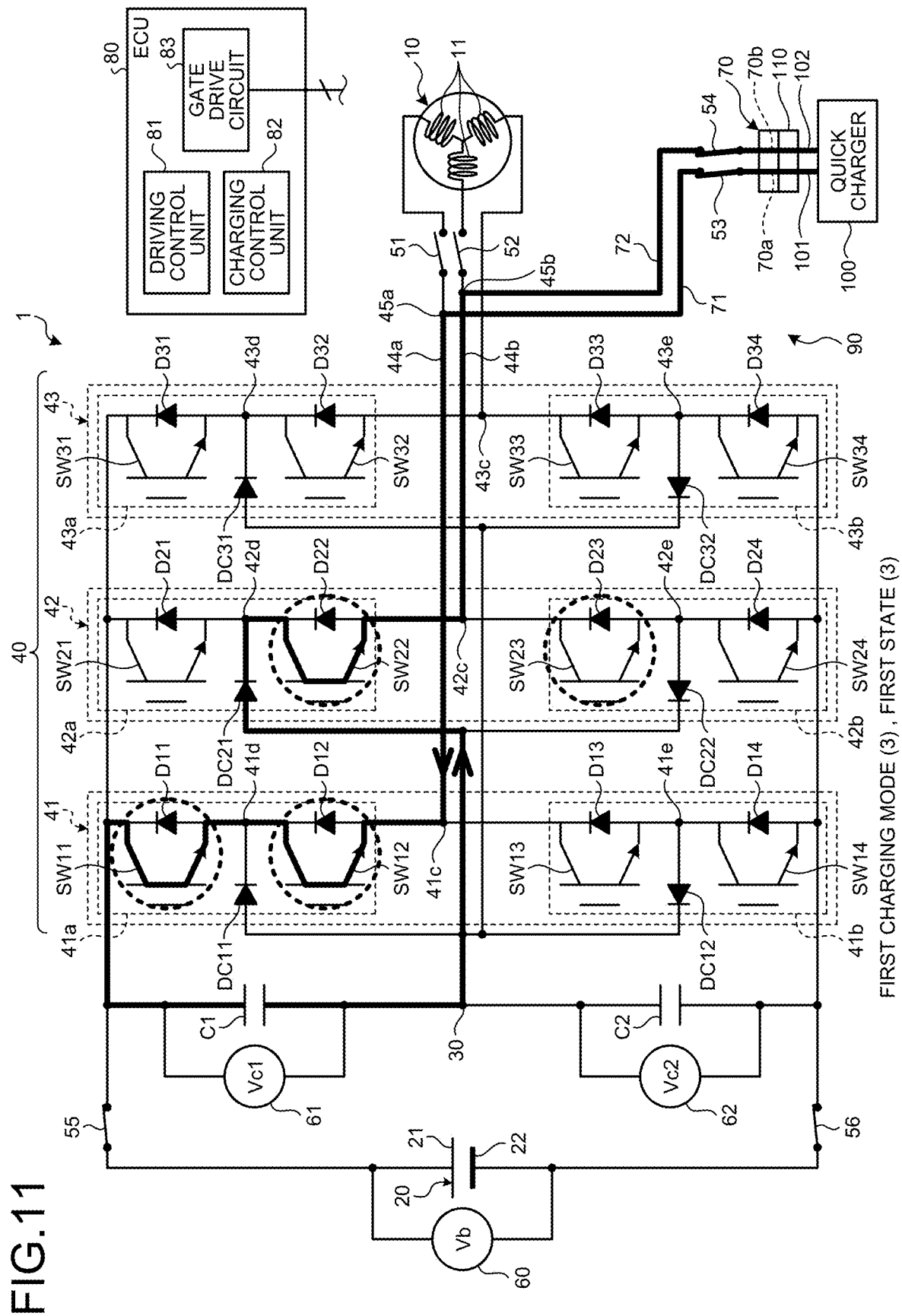
FIG. 11 is an explanatory diagram illustrating a charging path in a first state (3)

FIG. 11 is an explanatory diagram illustrating a charging path in a first state (3). In the first state (3), similarly to the first state (1) (see FIG. 2), a first midpoint 41c and a positive electrode 21 of the battery 20 are connected, and a second midpoint 42c and a voltage dividing point 30 are connected. In the first state (3) in the present embodiment, in addition to the switching elements SW11, SW12, and SW22 in the closed state in FIG. 2, only one of the switching elements SW23 and SW24 (only the switching element SW23 in the example of FIG. 11) is in the closed state. As described above, although either one of the switching elements SW23 and SW24 is in the closed state, the second midpoint 42c is not connected to the negative electrode 22 or the positive electrode 21, but is maintained to be connected to the voltage dividing point 30. Although not illustrated in FIG. 11, but this is similar to the case in which the switching element SW23 is in the open state and the switching element SW24 is in the closed state.

Second State (3)

Figure 12:
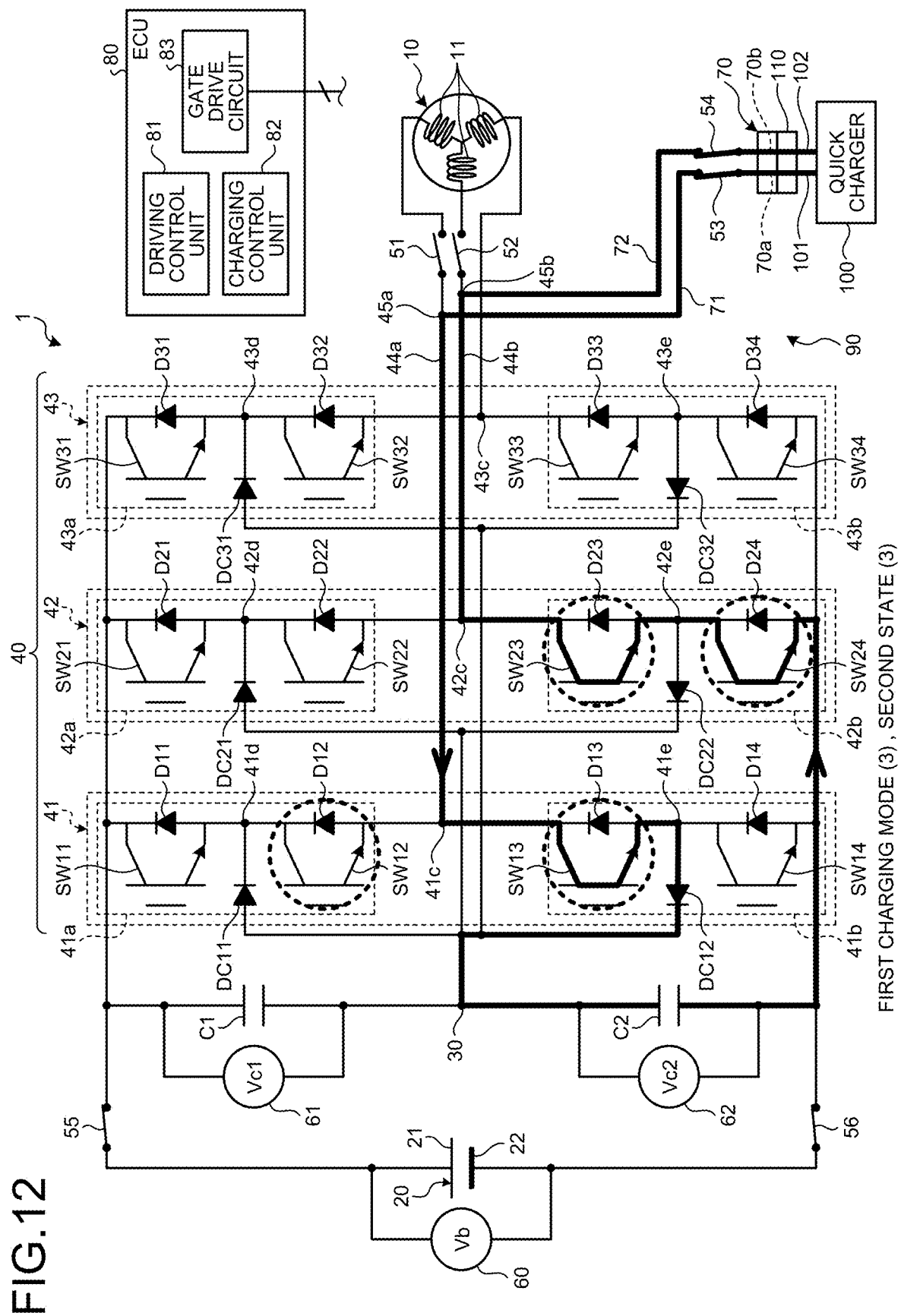
FIG. 12 is an explanatory diagram illustrating a charging path in a second state (3).

FIG. 12 is an explanatory diagram illustrating a charging path in a second state (3). In the second state (3), similarly to the second state (1) (see FIG. 3), the first midpoint 41c and the voltage dividing point 30 are connected, and the second midpoint 42c and the negative electrode 22 of the battery 20 are connected. In the second state (3) in the present embodiment, in addition to the switching elements SW13, SW23, and SW24 in the closed state in FIG. 3, only one of the switching elements SW11 and SW12 (only the switching element SW12 in the example of FIG. 12) is in the closed state. As described above, although either one of the switching elements SW11 and SW12 is in the closed state, the first midpoint 41c is not connected to the negative electrode 22 or the positive electrode 21, but is maintained to be connected to the voltage dividing point 30. Although not illustrated in FIG. 12, but this is similar to the case in which the switching element SW12 is in the open state and the switching element SW11 is in the closed state.

It is apparent from comparison between the first state (3) illustrated in FIG. 11 and the second state (3) illustrated in FIG. 12 that one of the switching elements SW23 and SW24 (the switching element SW23 in FIG. 11) that are in the closed state in the first state (3) is also in the closed state in the second state (3). Thus, one of the switching elements SW23 and SW24 does not need to be switched between the closed state and the open state in both the first state (3) and the second state (3), and the loss due to switching can be reduced.

Similarly, it is apparent from comparison between the second state (3) illustrated in FIG. 12 and the first state (3) illustrated in FIG. 11 that one of the switching elements SW11 and SW12 (the switching element SW12 in FIG. 12) that are closed in the second state (3) is also in the closed state in the first state (3). Thus, one of the switching elements SW11 and SW12 does not need to be switched between the closed state and the open state in the first state (3) and the second state (3), and the loss due to switching can be reduced.

In the present embodiment, although one of the switching elements SW23 and SW24 is switched between the open state and the closed state in the first state (3) and the second state (3), the switching elements SW11 and SW12 may be in the closed state in the first state (3) and in the open state in the second state (3). Alternatively, although one of the switching elements SW11 and SW12 is switched between the open state and the closed state in the first state (3) and the second state (3), the switching elements SW23 and SW24 may be in the open state in the first state (3) and in the closed state in the second state (3).

As described above, in the present embodiment, the ECU 80 (a control circuit) controls, in the first state (3) in the first charging mode (3), opening and closing of the switching elements SW21 to SW24 (second switching elements) so that either one of the switching elements SW23 and SW24, which are closed to connect the second midpoint 42c and the negative electrode 22 in the second state (3), is closed and that the second midpoint 42c and the negative electrode 22 are not connected.

With this configuration and control, either one of the switching elements SW23 and SW24 is maintained in the closed state in both the first state (3) and the second state (3), and the loss due to switching can be reduced accordingly. That is, charging can be more efficiently performed.

In addition, in the present embodiment, the ECU 80 controls, in the second state (3) in the first charging mode (3), opening and closing of the switching elements SW11 to SW14 (first switching elements) so that either one of the switching elements SW11 and SW12, which are closed to connect the first midpoint 41c and the positive electrode 21 in the first state (3), is closed and that the first midpoint 41c and the positive electrode 21 are not connected.

With this configuration and control, either one of the switching elements SW11 and SW12 is maintained in the closed state in both the first state (3) and the second state (3), and the loss due to switching can be reduced. That is, charging can be more efficiently performed.

The embodiments of the present disclosure have been exemplified above, but the above embodiments are merely examples, and are not intended to limit the scope of the disclosure. The above embodiments can be implemented in various other forms and variously omitted, replaced, combined, and modified without departing from the spirit of the disclosure. In addition, specifications of the configurations, shapes, and the like (structures, types, directions, models, sizes, lengths, widths, thicknesses, heights, numbers, arrangements, positions, materials, and the like) can be appropriately modified and implemented.

For example, the first arm and the second arm may be any of the three arms of the three-phase inverter. The present disclosure can also be applied to multilevel inverters of four or more levels. In this case, the charging device is only required to sequentially charge a plurality of capacitors (voltage dividing capacitors) by switching between the open state and the closed state of the switching elements of the multilevel inverter. In this case, the charging device can also control the determination of the charging time so that the difference between the voltages of the capacitors is reduced. In addition, the present disclosure is also applicable to multilevel inverters other than the neutral point clamp system.

In addition, the charging device may include, separately from the first changeover switch and the second changeover switch, a mechanism in order for the control circuit to electrically prevent movement of an electric vehicle during charging, such as an electronic parking brake (EPB).

According to a charging device of the present disclosure, although the maximum output voltage of an external direct-current power source is lower than the nominal voltage of a storage battery, the charging device can charge the storage battery by alternately charging first and second capacitors when the maximum output voltage of the external direct-current power source is equal to or greater than half of the nominal voltage of the storage battery.

According to an embodiment, when the maximum output voltage of the external direct-current power source is equal to or greater than the nominal voltage of the storage battery, the charging device can charge the storage battery more quickly with DC power of the external direct-current power source.

According to an embodiment, the difference between the terminal voltages of the first and second capacitors can be further reduced, and a more accurate waveform of the line voltage can be easily generated in the inverter.

According to an embodiment, the number of the first switching elements that switch between the open state and the closed state can be reduced, and the loss caused by switching between the open state and the closed state of the first switching elements can be reduced.

According to an embodiment, the number of the second switching elements that switch between the open state and the closed state can be reduced, and the loss caused by switching between the open state and the closed state of the second switching elements can be reduced.

According to an embodiment, the number of the second switching elements that switch between the open state and the closed state in the first state and the second state can be reduced, and the loss caused by switching between the open state and the closed state of the second switching elements can be reduced.

According to an embodiment, the number of the first switching elements that switch between the open state and the closed state in the first state and the second state can be reduced, and the loss caused by switching between the open state and the closed state of the first switching elements can be reduced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging device comprising:
   first and second capacitors connected in series between a positive electrode and a negative electrode of a storage battery;
   a first switching element including a plurality of switching elements and capable of selectively connecting a first midpoint between a first upper arm and a first lower arm of an inverter configured to drive a rotating electric machine to any one of the positive electrode, the negative electrode, and a voltage dividing point between the first and the second capacitors;
   a second switching element including a plurality of switching elements and capable of selectively connecting a second midpoint between a second upper arm and a second lower arm of the inverter to any one of the positive electrode, the negative electrode, and the voltage dividing point;

a first terminal connectable to the first midpoint and to a positive-electrode terminal of an external direct-current power source;
a second terminal connectable to the second midpoint and to a negative-electrode terminal of the external direct-current power source;
a first changeover switch capable of switching connection and disconnection between a winding of the rotating electric machine and the first midpoint;
a second changeover switch capable of switching connection and disconnection between the winding of the rotating electric machine and the second midpoint; and
a control circuit configured to control, while the first midpoint and the positive-electrode terminal of the external direct-current power source are connected via the first terminal, while the second midpoint and the negative-electrode terminal of the external direct-current power source are connected via the second terminal, and while the first changeover switch and the second changeover switch are in an open state, opening and closing of the first switching elements and the second switching elements to switch between a first state, in which the first midpoint and the positive electrode are connected and the second midpoint and the voltage dividing point are connected to charge the first capacitor with the external direct-current power source, and a second state, in which the first midpoint and the voltage dividing point are connected and the second midpoint and the negative electrode are connected to charge the second capacitor with the external direct-current power source.

2. The charging device according to claim 1, wherein the control circuit is configured to control, when a maximum output voltage of the external direct-current power supply is equal to or greater than a nominal voltage of the storage battery, opening and closing of the first switching elements and the second switching elements to connect the first midpoint and the positive electrode and connect the second midpoint and the negative electrode while the first midpoint and the positive-electrode terminal of the external direct-current power source are connected via the first terminal, while the second midpoint and the negative-electrode terminal of the external direct-current power source are connected via the second terminal, and while the first changeover switch and the second changeover switch are in the open state.

3. The charging device according to claim 1, wherein the control circuit is configured to control determination of a first charging time in the first state and a second charging time in the second state in a manner such that a difference between voltages of the first and second capacitors is reduced.

4. The charging device according to claim 1, further comprising
a first freewheeling diode provided in parallel with any one of the first switching elements provided to the first upper arm, wherein
the control circuit is configured to control the first switching element in parallel with the first freewheeling diode to be in the open state in the first state.

5. The charging device according to claim 1, further comprising
a second freewheeling diode provided in parallel with any one of the second switching elements provided to the second lower arm, wherein
the control circuit is configured to control the second switching element in parallel with the second freewheeling diode to be in the open state in the second state.

6. The charging device according to claim 1, wherein the control circuit is configured to control, in the first state, opening and closing of the second switching elements in a manner such that any one of the second switching elements that are closed to connect the second midpoint and the negative electrode in the second state is closed and that the second midpoint and the negative electrode are not connected.

7. The charging device according to claim 1, wherein the control circuit is configured to control, in the second state, opening and closing of the first switching elements in a manner such that any one of the first switching elements that are closed to connect the first midpoint and the positive electrode in the first state is closed and that the first midpoint and the positive electrode are not connected.

* * * * *